June 20, 1967

B. J. BUCHANAN 3,326,183

POWER INPUT TO AQUARIUMS

Filed Dec. 13, 1965

INVENTOR.
BEVERLY J. BUCHANAN
BY White & Haefliger
ATTORNEYS.

United States Patent Office 3,326,183
Patented June 20, 1967

3,326,183
POWER INPUT TO AQUARIUMS
Beverly J. Buchanan, 3915 Bouton Drive,
Lakewood, Calif. 90712
Filed Dec. 13, 1965, Ser. No. 513,495
9 Claims. (Cl. 119—5)

This invention relates generally to operation of aquariums and more specifically concerns the transmission of electrical power into aquarium tanks for operating power utilization devices therein.

It is a major object of the invention to facilitate transmission of electrical power in as simple a manner as possible to electrical devices within an aquarium tank so that the devices may operate even though submerged in tank water. Where a number of such devices are to be operated, the number of lines extending into the tank becomes unwieldy and unattractive; also, it becomes difficult to safely and effectively transmit power at normal home power service voltages to submerged devices, since the more such devices are utilized, the greater is the chance that an aquarist will be endangered by electrical shock upon hand contact with the water.

The present invention makes possible an unusually advantageous solution to the above problem, using simple equipment. Basically, the solution involves the provision of a voltage step-down transformer and an electrical lead of a length to extend into the tank interior to transmit electrical current at a safe low voltage level, i.e. less than 10 volts, to a utilization device submerged in the tank interior. Typically, terminal means such as may include multiple sockets or plugs have electrical connection with the single lead so as to be submerged within the tank, whereby the multiple lines leading to the utilization devices may be submerged and concealed. As a result, only one lead extends into the tank, the transformer may be concealed outside the tank, the multiple leads leading to the utilization devices are concealed within the tank, and power is transmitted to operate all the devices at safe, low voltage levels.

Figure 1:
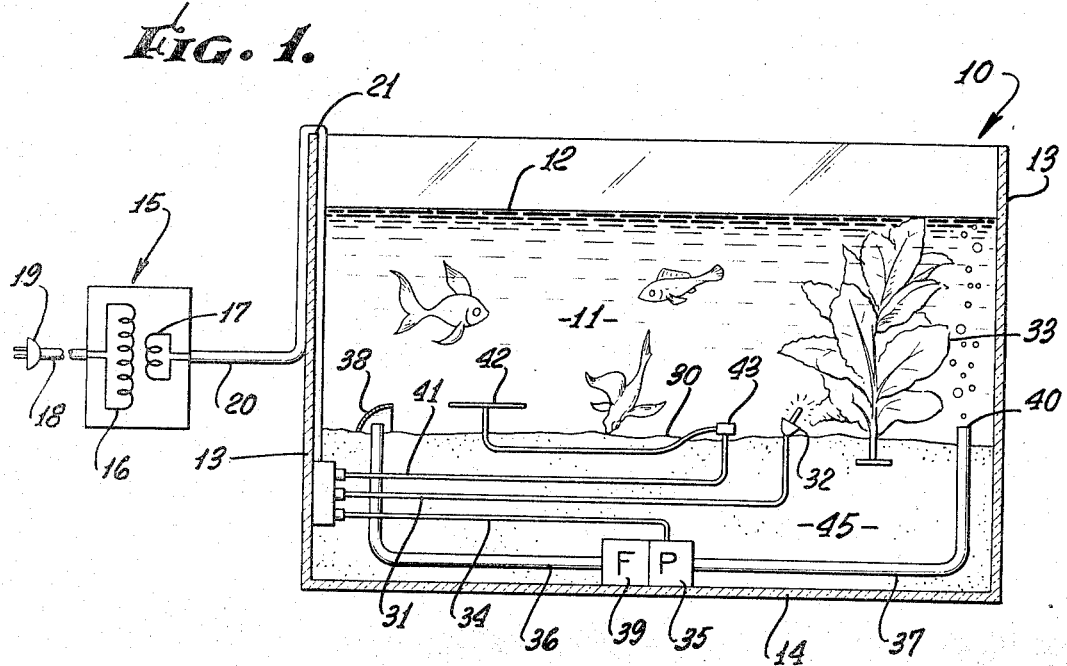
Figure 2:
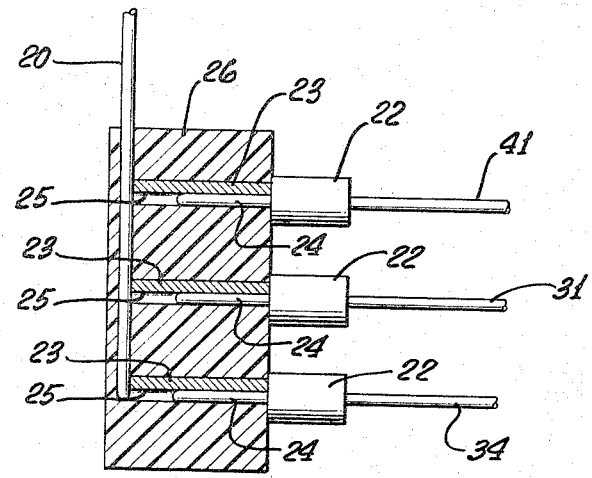

These and other objects and advantages of the invention, as well as the details of illustrative embodiments, will be more fully understood from the following detailed description of the drawings, in which:

FIG. 1 is a vertical elevation taken in section through an aquarium tank embodying the invention; and FIG. 2 is an enlarged view showing one form of submerged plug and socket assembly that may be used.

Referring first to FIG. 1, the aquarium tank 10 is filled with water 11 to surface level 12, and has side walls 13 as well as bottom wall 14. In accordance with the invention, means provided to transmit electrical power from the exterior to the interior of the tank includes a voltage step-down transformer and an electrical lead extending into the tank interior to transmit current at a voltage level less than 10 volts to a utilization device submerged in the tank water.

A voltage step-down transformer is indicated at 15 as having a primary and secondary windings 16 and 17, the former connected via lead 18 with plug 19 adapted to supply normal home power service at 120 volts AC. Secondary coil 17, which has fewer winding than coil 16, is connected with lead 20 of a length to extend from the exterior to the interior of tank 10. Typically, single lead 20 may be adhesively bonded to the inside and outside surfaces of wall 13, so as to remain substantially out of sight. As is clear, the lead extends over edge 21 of the wall.

Located within the tank so as normally to be exposed to water therein is what may be referred to as terminal means to which lead 20 has electrical connection. FIGS. 1 and 2 show one such terminal means in the form of plugs 22 and sockets 23 submerged and concealed as below the top 30 of the sand and gravel layer 45 in the tank. Plugs 22 have pins 24 that may be inserted into openings 25 in the socket body 26 for making electrical contact with the sockets 23 to which lead 20 has electrical connection.

Connected with the plugs 22 are multiple leads 31, 34 and 41 that are concealed below surface 30, the leads running to different low voltage power utilization devices. For example, lead 31 runs to an electrical light 32, which may be safely operated under water at 6 volts for illumination purposes, an illuminated miniature tree 33 being representative.

Lead 34 is concealed and runs to an electrical motor driven pump 35, also indicated at P. Submerged and concealed ducts 36 and 37 circulate aquarium water from inlet 38 to filter 39, then through the pump 35 and to outlet 40. Lead 41 supplies heater plate 42 with power, a thermostat 43 being connected in series with that lead to control the operation of the plate so as to keep the water temperature within a predetermined range. Devices 35 and 42 may be operated with power at about 6 volts.

As is clear from the drawing, the aquarist's observation of the tank and the marine life therein is completely undisturbed by power operated components, devices and leads; the powered equipment is operated underwater at low voltage, obviating dangerous shocking problems; and one or more of the utilization devices may be disconnected simply by removing a plug pin 24 from its socket at the concealed terminal means as represented in FIG. 2. Also, only a single lead 20 is needed for transmitting power to the interior of the tank.

I claim:
1. In combination, an aquarium tank having an upright side wall, and means to transmit electrical power from the exterior to the interior of the tank, said means including a voltage step-down transformer and an insulated electrical lead extending into the water in the tank interior to transmit current at a voltage level less than 10 volts to a utilization device submerged in the tank water, said transformer being located outside the tank and said lead extending from the transformer into the tank to a submerged location therein.

2. The combination of claim 1 including said utilization device having an electrical terminal exposed to water within the tank.

3. The combination of claim 1 in which the transformer has windings to reduce the voltage supplied to said lead to about six volts.

4. The combination of claim 1 including plug and socket means within the tank to which said lead has electrical connection.

5. The combination of claim 2, in which said device comprises an electrical light.

6. The combination of claim 2, in which said device comprises an electrical heater.

7. The combination of claim 2, in which said device comprises an electrical motor.

8. The combination of claim 1, in which said lead is adhesively bonded to said wall.

9. For combination with an aquarium tank having an upright side wall and an electrical utilization device within the tank, a voltage step-down transformer exterior of the tank, an insulated electrical lead of a length to extend from the transformer on the exterior to a submerged position in the interior of the tank, and terminal means to which said lead has electrical connection exposed to water within the tank, the said transformer having voltage step-down windings to reduce the voltage of current transmitted to the terminal means to less than 10 volts, said utilization means being connected to said terminal means.

References Cited

UNITED STATES PATENTS

| | | | |
|---|---|---|---|
| 1,803,571 | 5/1931 | Ulman | 240—2 |
| 1,939,583 | 12/1933 | Welshausen | 119—5 X |
| 2,566,990 | 9/1951 | Mahle | 119—5 X |
| 3,018,758 | 1/1962 | Arnould | 119—5 |
| 3,185,829 | 5/1965 | Rau | 240—4 |
| 3,234,905 | 2/1966 | Olson | 119—5 |
| 3,276,428 | 10/1966 | Burch | 119—5 |

FOREIGN PATENTS 1,267,479  6/1961  France.

SAMUEL KOREN, *Primary Examiner.*

ALDRICH F. MEDBERY, *Examiner.*